(12) United States Patent
Kamiya et al.

(10) Patent No.: US 8,783,635 B2
(45) Date of Patent: Jul. 22, 2014

(54) CUP HOLDER

(75) Inventors: Taku Kamiya, Utsunomiya (JP);
Hiroyuki Kinou, Nasushiobara (JP);
Atushi Ogawa, Shanghai (CN); Takuya Uehara, Moka (JP)

(73) Assignees: Honda Motor Co., Ltd, Tokyo (JP);
NIFCO Inc., Yokohama-Shi (JP);
Moriroku Technology Company, Ltd., Tokyo (JP)

( * ) Notice: Subject to any disclaimer, the term of this patent is extended or adjusted under 35 U.S.C. 154(b) by 172 days.

(21) Appl. No.: 13/152,728

(22) Filed: Jun. 3, 2011

(65) Prior Publication Data

US 2011/0297715 A1 Dec. 8, 2011

(30) Foreign Application Priority Data

Jun. 4, 2010 (JP) ................. 2010-129226

(51) Int. Cl.
*B60N 3/10* (2006.01)

(52) U.S. Cl.
USPC .......... 248/311.2; 224/926; 224/282

(58) Field of Classification Search
CPC .......... B60N 3/10; B60N 3/106; B60N 3/108
USPC ......... 224/539, 926, 544, 570, 414, 462, 282;
248/311.2, 314, 316.2, 316.3, 316.5,
248/313; 220/737
See application file for complete search history.

(56) References Cited

U.S. PATENT DOCUMENTS

| | | | | |
|---|---|---|---|---|
| 5,782,448 A * | 7/1998 | Withun et al. | ............. | 248/311.2 |
| 5,839,711 A * | 11/1998 | Bieck et al. | .................. | 248/313 |
| 6,637,709 B1 * | 10/2003 | Guenther et al. | .......... | 248/311.2 |
| 7,380,762 B2 * | 6/2008 | Takeichi | .................... | 248/311.2 |
| 7,520,405 B2 * | 4/2009 | Ishida et al. | .................. | 220/737 |
| 7,520,482 B2 * | 4/2009 | Shin | ............................. | 248/311.2 |
| 7,597,300 B2 * | 10/2009 | Harada | ....................... | 248/311.2 |
| 7,789,265 B2 * | 9/2010 | Kearney et al. | ............... | 220/737 |
| 7,866,620 B2 * | 1/2011 | Kaemmer | .................. | 248/311.2 |
| 8,113,477 B2 * | 2/2012 | Kaemmer | .................. | 248/311.2 |
| 8,353,495 B2 * | 1/2013 | Ogura | ........................ | 248/311.2 |

(Continued)

FOREIGN PATENT DOCUMENTS

| CN | 1111577 | 11/1995 |
|---|---|---|
| CN | 1939770 | 4/2007 |
| JP | 08-119021 | 5/1996 |
| JP | 11-070831 | 3/1999 |

(Continued)

OTHER PUBLICATIONS

Japanese Office Action for Application No. 2010-129226 dated Apr. 10, 2012, four pages.

(Continued)

*Primary Examiner* — Brian D Nash
*Assistant Examiner* — Corey Skurdal
(74) *Attorney, Agent, or Firm* — Rankin, Hill & Clark LLP

(57) ABSTRACT

A cup holder holding an object includes: a storing part being cylindrical and being opened at an upper portion; an opening part provided at a side wall of the storing part; a holder being biased towards an interior of the storing part and being stored inside the opening part so that the holder may protrude and retract; and a restricting part provided on the opening part, wherein the restricting part restrains a movement of the holder at a maximum storage position.

4 Claims, 6 Drawing Sheets

(56) References Cited

U.S. PATENT DOCUMENTS

| | | | |
|---|---|---|---|
| 8,662,580 B2* | 3/2014 | Henke et al. | 297/188.14 |
| 2003/0155476 A1* | 8/2003 | Nakaya | 248/311.2 |
| 2004/0021048 A1* | 2/2004 | Schaal | 248/310 |
| 2004/0108428 A1* | 6/2004 | Leopold | 248/311.2 |
| 2005/0279752 A1* | 12/2005 | Harada | 220/759 |
| 2007/0075205 A1* | 4/2007 | Shin et al. | 248/311.2 |
| 2008/0217370 A1* | 9/2008 | Shin | 224/539 |
| 2009/0146035 A1* | 6/2009 | Kaemmer | 248/313 |
| 2009/0152285 A1* | 6/2009 | Kearney et al. | 220/737 |

FOREIGN PATENT DOCUMENTS

| | | |
|---|---|---|
| JP | 2004-082887 | 3/2004 |
| JP | 3137651 U | 12/2007 |
| JP | 2009-262712 | 11/2009 |

OTHER PUBLICATIONS

Chinese Office action dated Dec. 5, 2013, English translation included.

* cited by examiner

CUP HOLDER

BACKGROUND OF THE INVENTION

The present application claims priority on Japanese Patent Application No. 2010-129226, filed Jun. 4, 2010, the content of which is incorporated herein by reference.

1. Field of the Invention

The present invention relates to a cup holder of a vehicle, for example. A container of a beverage may be placed on the cup holder. In particular, the present invention relates to a cup holder which supports a peripheral wall of the container of the beverage that is placed, thereby preventing the container of the beverage from wobbling.

2. Description of the Related Art

Conventional cup holders have been configured as follows: First, the cup holder comprises a storing part of a container of a beverage, which is opened in an upward direction. An opening part is provided at an upper portion of a side wall of this storing part. A pivot shaft is provided on this opening part. An axis of the pivot shaft is in a horizontal direction. A support is made by biasing a holder to this pivot shaft with a biasing part. The holder may protrude and retract from the opening part towards an inner side of the storing part. (See, for example, Japanese Unexamined Patent Application, First Publication No. 2004-082887.)

Therefore, when the container of the beverage is inserted in the storing part, the holder resists against the biasing part. Thus, the holder is pushed inside the opening part formed on the side wall of the storing part. When the insertion of the container of the beverage is completed, the holder presses against a peripheral wall of the container of the beverage in a condition in which the holder is biased by the biasing part. As a result, the container of the beverage is prevented from wobbling.

Further, when there is a constricted part at an outer peripheral surface of the container of the beverage, the holder might become stuck in the constricted part of the container of the beverage that is about to be removed. However, a force, which is applied to the holder from the container of the beverage that is about to be removed, acts on a lower side with respect to the pivot shaft of a supporting part. Therefore, this force is applied so as to push the holder into the opening part. Therefore, the container of the beverage may be removed by directly picking up the container.

However, according to the conventional cup holder described above, when a user is about to remove a cup holder, and the user feels even a little resistance during the removing action as if the holder is stuck in the constricted part of the container of the beverage, it is possible that the user may insert his or her finger inside the opening part in order to unlock the holder supporting the container of the beverage. In order to withhold this action, it is necessary to enhance the robustness of the pivot shaft, enlarge components, and the like.

SUMMARY OF THE INVENTION

The present invention is made considering the problems described above. Accordingly, an object of the present invention is to provide a cup holder which does not necessitate a robustness of a pivot shaft to be enhanced nor a size of a component to be enlarged.

(1) Namely, a cup holder holding an object according to an aspect of the present invention includes a storing part being cylindrical and being opened at an upper portion; an opening part provided at a side wall of the storing part; a holder being biased towards an interior of the storing part and being stored inside the opening part so that the holder may protrude and retract; and a restricting part provided on the opening part, wherein the restricting part restrains a movement of the holder at a maximum storage position.

(2) In addition, the above cup holder may be configured as follows: An upper part of the holder is supported, centered around an axial part provided on the opening part along a horizontal direction. In addition, a lower part of the holder is provided to the opening part so that the lower part may protrude and retract by oscillating.

(3) In addition, the above cup holder may be configured as follows: The restricting part is provided so as to straddle across the opening part.

(4) In addition, the above cup holder may be configured as follows: A guide part is provided at a lower part of the holder. This guide part elastically supports a peripheral wall of the object. The guide part also directs a reactive force, received by the object in a normal line direction at a contact point with the object, towards a position lower than an axial part.

According to the above aspect of the present invention described in (1) above, when a container of a beverage is pulled out from the storing part and the storing part became stuck at a constricted part of the container of the beverage, and when a user pushes in the holder in order to release the storing part being stuck, the holder pushed into the opening part of the storing part is restricted by a restricting part from moving in a direction in which the holder is pushed in. Therefore, the load being applied to the axial part is reduced. Further, the axial part is prevented from breaking. Further, it is not necessary to enlarge the axial part in order to enhance the robustness of the axial part. Neither is it necessary to enlarge other periphery components. Therefore, the size may be made smaller and the weight may be made lighter.

According to the above aspect of the present invention described in (2) above, a lopsided force is not applied to a fluctuation of the holder to a storing position when the user inserts a finger between a peripheral wall of the container of the beverage and the storing part.

According to the above aspect of the present invention described in (3) above, the restricting part may operate as a reinforcing component to enhance the robustness of the opening part. Thus, it is not necessary to increase the thickness around the opening part. Neither is it necessary to provide a separate reinforcing component. In this way, the size may be made smaller.

According to the above aspect of the present invention described in (4) above, even when the holder becomes stuck at a constricted part of a container of a beverage when the container of the beverage is pulled up, a force, being applied from the container of the beverage to the holder due to the pulling force of the container of the beverage, is applied so as to push in the holder. Therefore, the pulling up of the container of the beverage may be tolerated. Even if the user feels that the container of the beverage cannot be pulled up, and inserts a finger between the container of the beverage and the storing part and pushes in the holder, the restricting part allows the user to feel that the holder has been pushed into a releasing position. In this way, the restricting part prevents a movement pushing the holder any further.

BRIEF DESCRIPTION OF THE DRAWINGS

FIG. 4 shows how a folder is being attached.

FIG. 5A is a cross sectional view of a condition in which a container of a beverage is stored.

FIG. 5B is a cross sectional view showing a condition in which the holder is released.

DETAILED DESCRIPTION OF THE PREFERRED EMBODIMENTS

Hereunder, an embodiment of the present invention is described with reference to the diagrams. In the following description and diagrams, FR indicates a frontal side of a vehicle.

Figure 1:
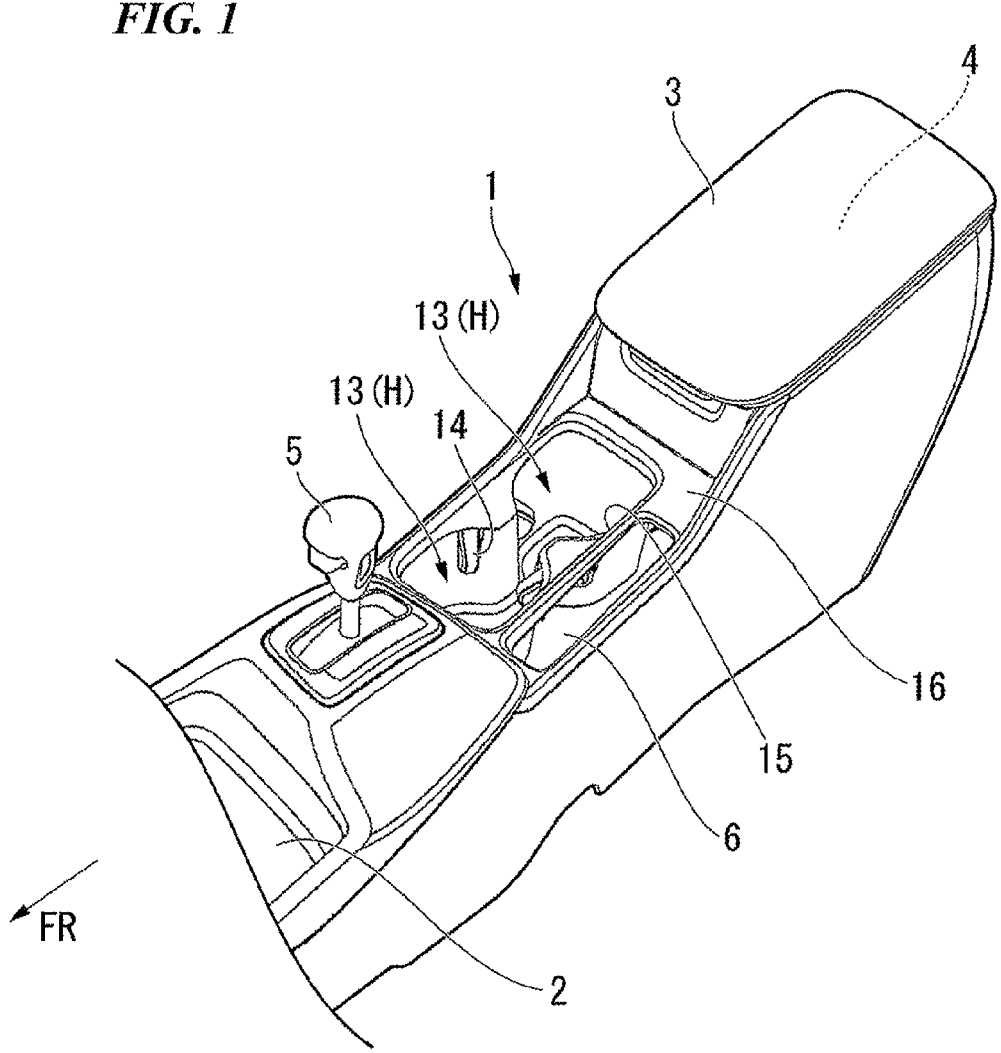
FIG. 1 is a perspective view of a around a console according to an aspect of the present invention.

In FIG. 1, element 1 indicates a console 1 placed between a driver's seat of a vehicle and a passenger's seat. A front portion storing part 2 is provided at a front portion of the console 1 in a front-rear direction of the vehicle. An upper portion of the front portion storing part 2 is opened. A rear portion storing part 4 is provided at a rear portion of the console 1. The rear portion storing part 4 is covered by a lid 3 which may be opened and closed. An upper portion of the lid 3 acts as an arm rest. An AT lever 5 is placed at a rear portion of the front portion storing part 2. Two cup holders H, H are placed between the position of the AT lever 5 and the rear portion storing part 4. The cup holders H, H are placed along the front-rear direction of the vehicle. Incidentally, a lever opening part 6 for a parking lever is placed next to the cup holders H, H.

Figure 2:
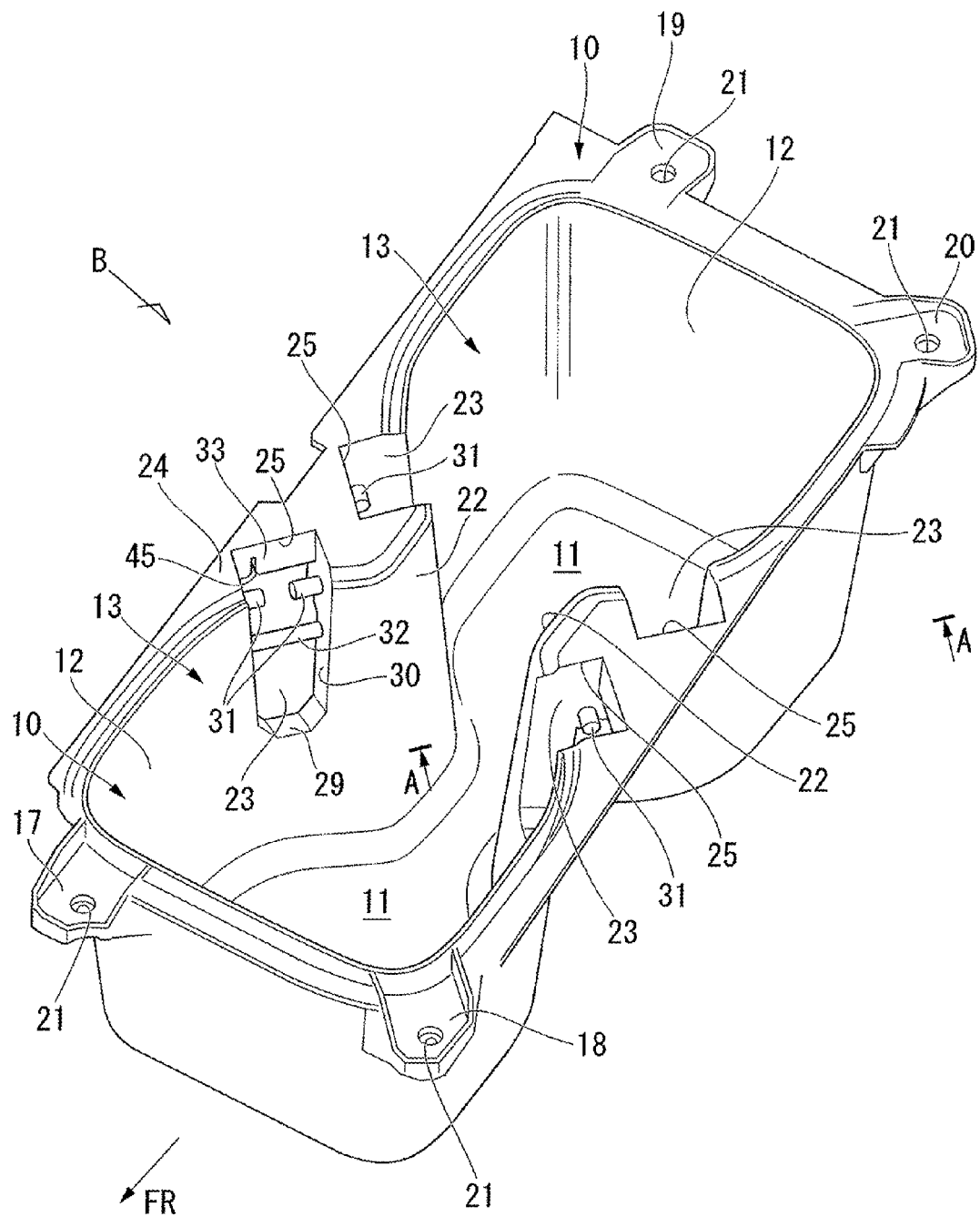
FIG. 2 is a perspective view of a storing part of a cup holder according to an aspect of the present invention.
Figure 3:
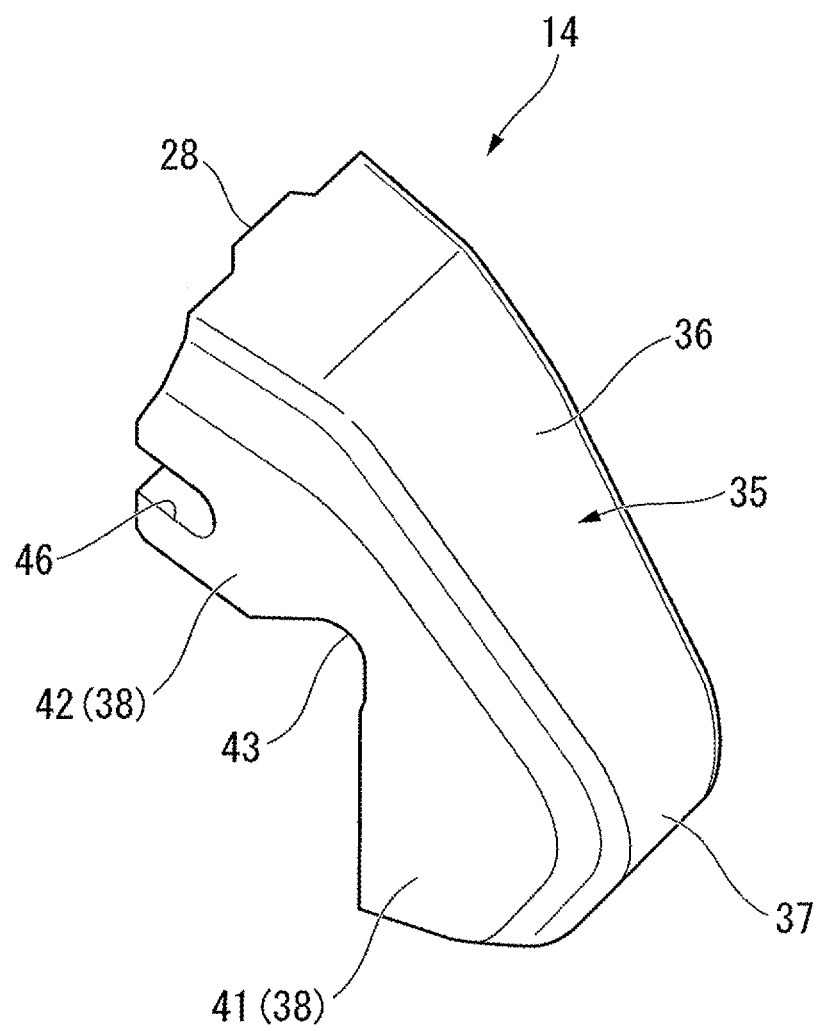
FIG. 3 is a perspective view of a holder according to an aspect of the present invention.
Figure 4:
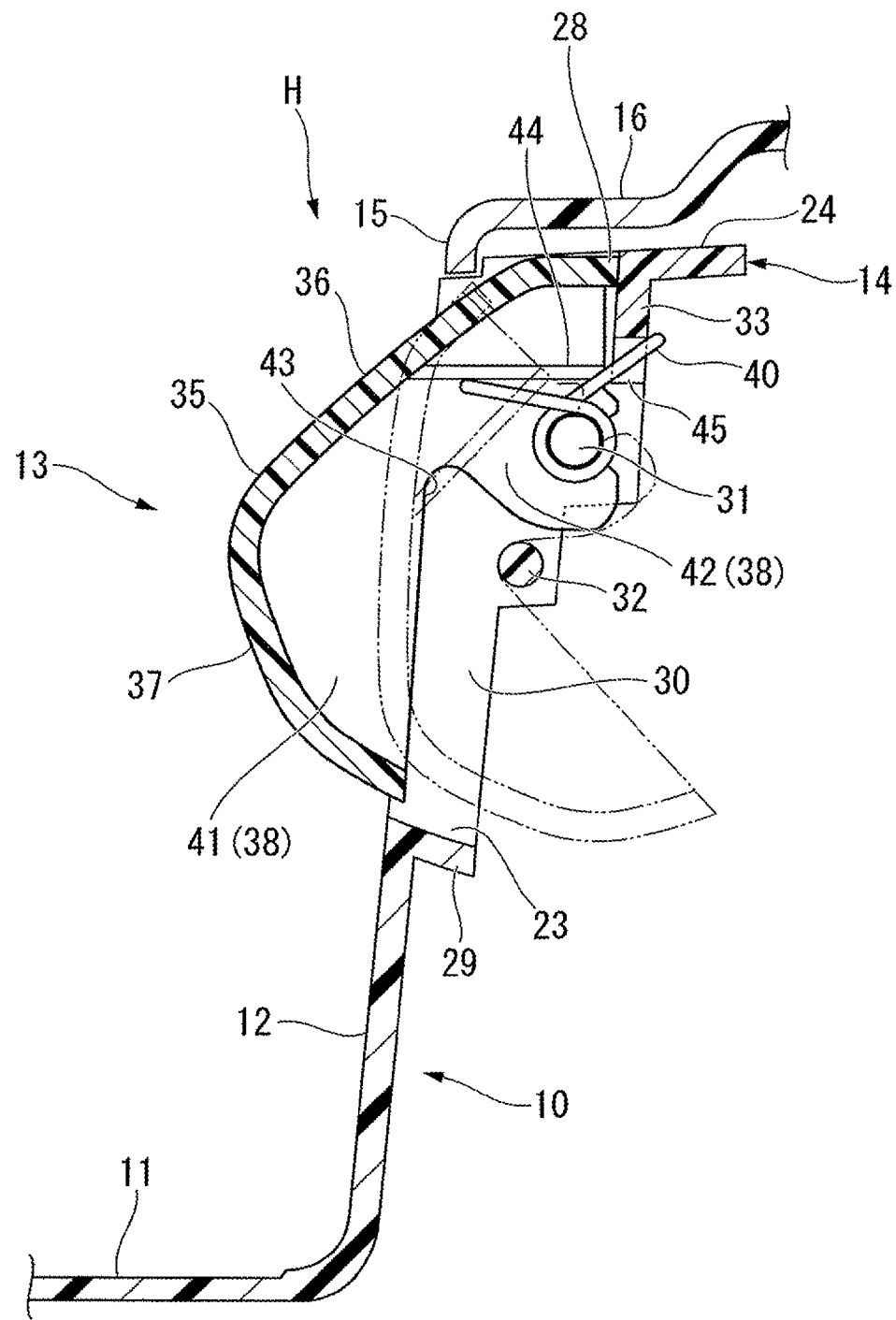
FIG. 4 is a cross sectional view along line A-A in FIG. 2.

As shown in FIGS. 1 and 2, the cup holder H comprises a cup holder main body 10, a holder 14, and a panel material 16 (see FIG. 4 as well). The cup holder main body 10 comprises a storing part 13. The storing part 13 is cylindrical and comprises a bottom wall 11 and a side wall 12. An upper portion of the side wall 12 is opened. The holder 14 is provided at the side wall 12 of the cup holder main body 10. The holder 14 supports a peripheral wall of a beverage container Y (see FIG. 5). The holder 14 supports the beverage container Y by pushing the beverage container Y against an opposing side wall 12. The panel material 16 comprises an opening 15 through which the beverage container Y is inserted. The panel material 16 surrounds a periphery of the storing part 13 of the cup holder 10. A portion of the upper wall of the console 1 comprises the panel material 16.

Two fixing brackets 17, 18 are placed at a front side of the cup holder main body 10 of the cup holder H at a front side. Two fixing brackets 19, 20 are placed at a rear side of the cup holder main body 10 of the cup holder H at a rear side. The fixing brackets 17, 18, 19, and 20 are each provided continuous to the rim flange part 24. A mounting hole 21 is placed on each of the fixing brackets 17 through 20. Here, the two cup holders H, H are configured so that each storing part 13, 13 forms a storing space connected at a constricted part 22.

A pair of long opening parts 23 is formed at a side wall 12 of each cup holder main body 10 at a slanted portion close to the constricted part 22. The opening part 23 is elongated in the upper-lower direction. The opening part 23 comprises a cut out portion 25 at the rim flange part 24 of the cup holder main body 10. An upper portion of the cut out portion 25 is rectangular. The opening part 23 has a depth towards a thickness direction of the side wall 12 of the cup holder main body 10.

The opening part 23 is slightly narrowed towards a lower portion. A holder 14 is attached to this opening part 23. The holder 24 supports a peripheral wall of the beverage container Y.

Axial parts 31, 31 are coaxially provided at an upper portion of the opening part 23. Each of the axial parts 31, 31 protrudes in a horizontal direction from side walls 30 of the opening part 23 which oppose one another. Furthermore, at a lower portion of the opening part 23, a rod shaped restricting part 32 is provided. The rod shaped restricting part 32 connects the opposing wall parts 30 of the opening part 23 so as to straddle the opposing wall parts 30. The restricting part 32 is placed lower than the axial parts 31, 31 and towards the storing part 13 side compared to the axial parts 31, 31. Here, the restricting part 32 is provided at a position corresponding to a height at which a finger hits when a user inserts a finger between the beverage container Y and the side wall 12 of the storing part 13. Incidentally, although the restricting part 32 according to an aspect of the present invention is configured so that its cross section is circular, a configuration is also possible such that the cross section of the restricting part 32 is not round (triangular, rectangular, and the like). Here, each opposing wall part 30 of the opening part 23 is connected at an upper back side with a rear wall 33. Meanwhile, each opposing wall part 30 of the opening part 23 is connected at a lower portion with a lower wall 29. In these ways, a periphery of the opening part 23 is made robust. An end of a torsion spring 40, described later, is latched to the rear wall 33.

As shown in FIGS. 3-6, the holder 14 is provided at the opening part 23 in a condition in which the holder 14 is biased towards an inner side of the storing part 13. The holder 14 is provided so that the holder may be pressed against the inner side of the storing part 13 and may also be released so as to protrude from the inner side of the storing part 13.

The holder 14 comprises a guide part 35 placed in a direction along the side wall 12 of the storing part 13. A flat part 36 is provided at an upper portion of the guide part 35. A curved part 37 is provided at a lower portion of the guide part 35. The curved part 37 is curved towards an outer side of the storing part 13. The guide part 35 elastically supports the peripheral wall of the beverage container Y with a torsion spring 40. When the guide part 35 is supported, the guide part 35 is shaped so that, a direction of the reactive force F, applied at a contact point P with the beverage container Y from the beverage container Y in a direction of a normal line, is pointed towards a position lower than the axial parts 31, 31 (see FIG. 5(a)).

At both ends of the guide part 35, a pair of side wall parts 38, placed along the wall part 30 of the opening part 23, is placed so as to form a U shape with the guide part 35. The side wall part 38 comprises a lower side wall part 41 and an upper side wall part 42. The lower side wall part 41 is formed so as to protrude by a longer length.

An axis-receiving cut out part 46 is formed at a side rim of each of the upper side wall part 42. The axis-receiving cut out part 46 receives the axial portions 31, 31 of the opening part 23 and rotatably supports the axial portions 31, 31. By latching this axis-receiving cut out part 46 to the axial portions 31, 31 of the opening part 23, the holder 14 is supported by the opening part 23, with the axial parts 31, 31 being the center. Here, the holder 14 is supported in a condition such that the holder 14 may oscillate.

As described above, the upper side wall part 42 and the lower side wall part 41 protrude by a longer length. As a result, when the holder 14 oscillates inside the opening part 23, with the axial parts 31, 31 being the center, the wall part 30 of the opening part 23 still operates as a guide even when an upper portion and a lower portion having a large amount of oscillation is detached from the wall part 30 of the opening part 23. Here, each of the lower side wall part 41 is connected with a lower side wall part 39. As a result, the guide part 35 is reinforced.

Further, a restriction protrusion 28 is provided at an upper end of the guide part 35. The restriction protrusion 28 contacts a rear wall 33 of the opening part 23. The restriction protrusion 28 puts a restraint on a maximum protrusion position of the holder 14 biased by the torsion spring 40 towards a storing part 13 side.

Between an upper side wall part 42 and the lower side wall part 41 of the holder 14, a restricting part receiving member 43 is formed at a position corresponding to a position at which the restricting part 32, provided on the opening part 23, is formed. The length of protrusion of the restricting part receiving member 43 from the guide part 35 is small. The restricting part receiving member 43 is formed so that a side rim of the upper side wall part 42 and the lower side wall part 41 are gradually dropped in.

A reinforcing rib 44 is provided between a back side of the guide part 35 of the holder 14 and the upper side wall part 42. Due to this reinforcing rib 44, a compartmentalized space is formed in an upper portion of the holder 14. As a result, the robustness and the rigidity are enhanced. A torsion spring 40 is provided on the axial parts 31, 31 of the opening part 23 of the storing part 13. The torsion spring 40 is provided such that an end part is latched to a latching part 45 and the reinforcing rib 44. Due to this torsion spring 40, the holder 14 is provided in a condition in which the holder 14 is biased towards an inner side of the storing part 13. Moreover, the holder 14 may protrude and retract from the opening part 23.

Here, as shown in FIG. 4, when the holder 14 moves in a direction so as to be contained inside the opening part 23, the restricting part 32 restricts the holder 14 from moving outside the storing part 13. In further detail, the restricting part 32 presses the restricting part receiving member 43 at a maximum storage position which roughly matches with a position at which a flat part 36 of the guide part 35 of the holder 14 is positioned along the side wall 12 of the storing part 13.

Figure 5A:
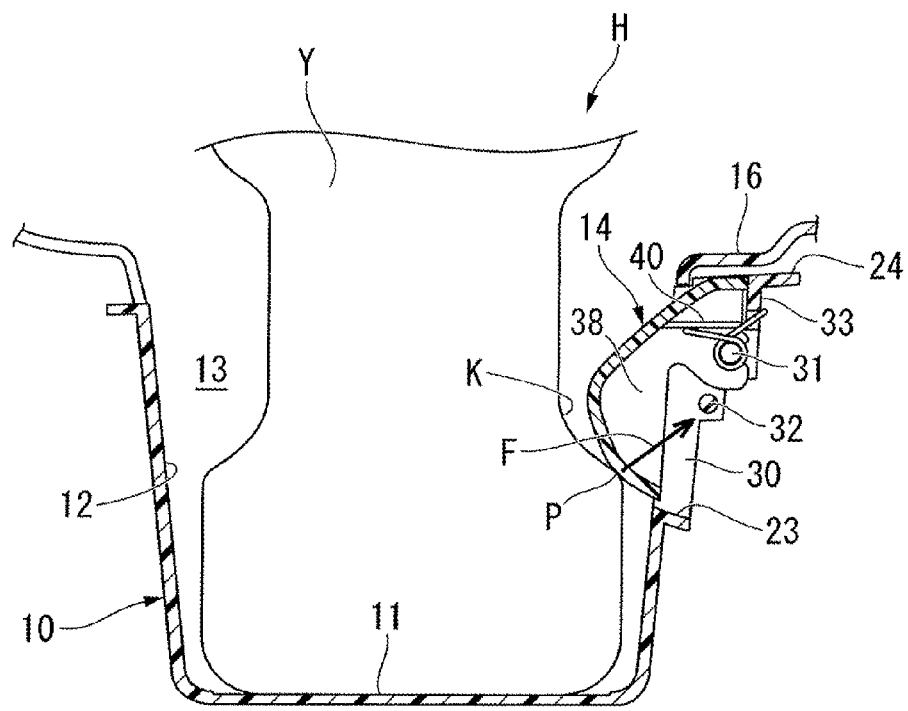
FIG. 5A shows how a holder operates.

According to the above embodiment, when the cup holder H is used, even if the holder 14 gets stuck at the constricted part K of the beverage container Y, as shown in FIG. 5A, it is possible to pull up the beverage container Y directly. This is because, when the beverage container Y is pulled up directly, the reactive force F that the holder 14 receives from the beverage container Y is pointing towards a lower side of the axial parts 31, 31, thereby making the holder 14 oscillate outwards around the axial parts 31, 31.

Figure 5B:
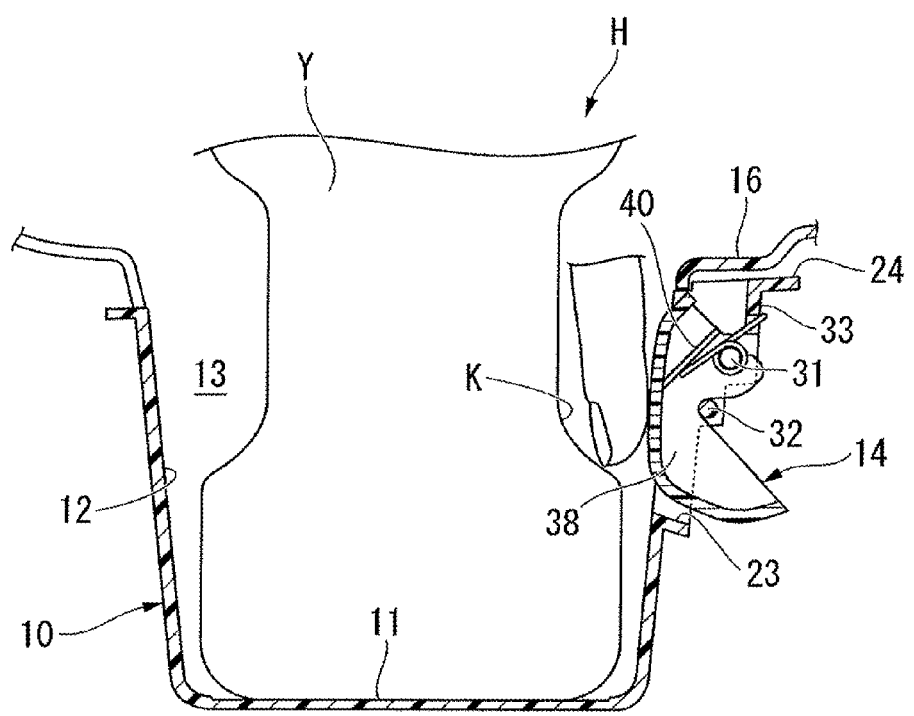
FIG. 5B shows how a holder operates.
Figure 6:
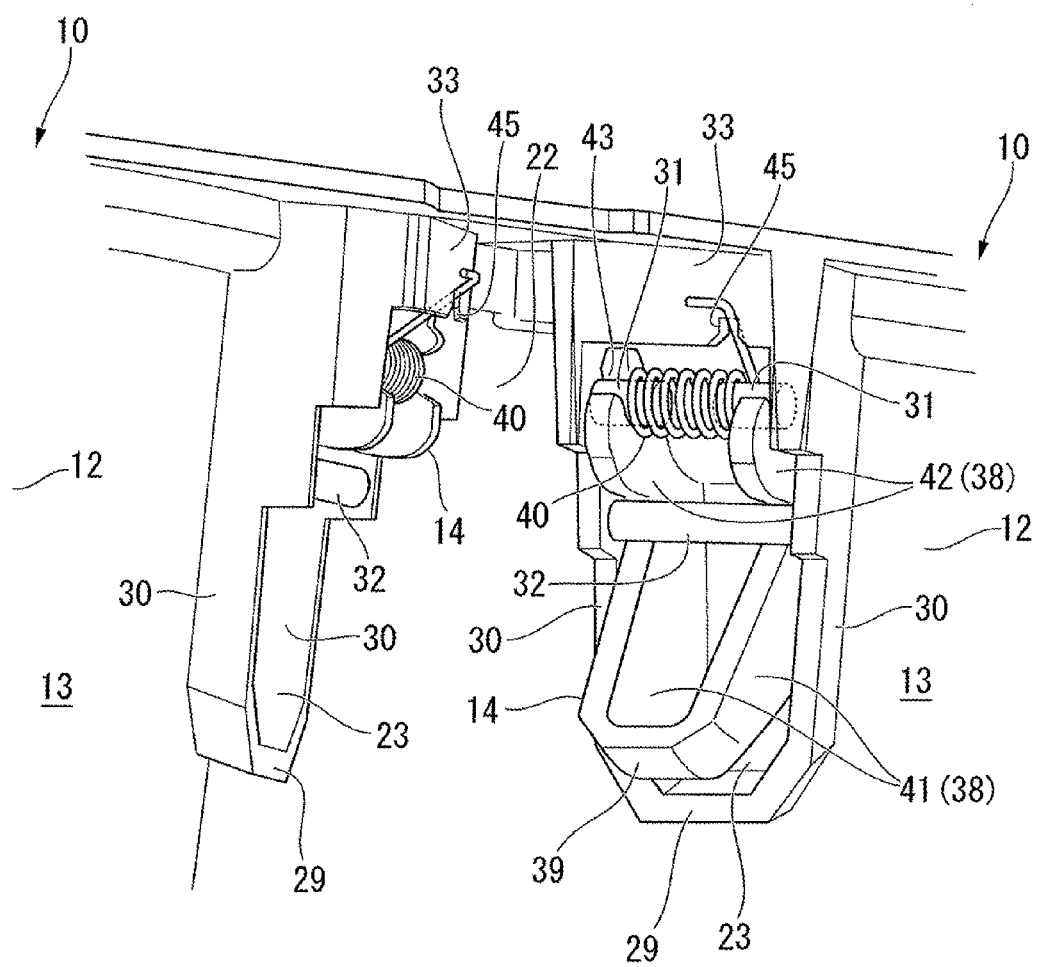
FIG. 6 is a diagram showing a view of FIG. 2 seen from an arrow B.

Here, when the user pulls up the beverage container Y and feels that the beverage container Y is somehow stuck, the user might insert a finger between the beverage container Y and the holder 14 and try to pull up the beverage container Y by pushing in the holder 14, as shown in FIG. 5B. At this time, even if a large magnitude of force applies to the holder 14 in a direction pushing in the holder 14, the restricting part 32 supports the restricting part receiving member 43 of the holder 14. The restricting part 32 is fixed across the wall part 30 of the opening part 23.

Therefore, the force applied to the holder 14 is supported collectively by the entire opening part 23 by the restricting part 32 and the wall part 30. As a result, it is possible to reduce the load applied to the axial parts 31, 31 of the opening part 23, thereby preventing the axial parts 31, 31 from breaking. Therefore, it is not necessary to enhance the robustness of the axial parts 31, 31. Neither is it necessary to enlarge the axial parts 31, 31. Neither is it necessary to enlarge various peripheral components. In this way, it is possible to reduce the size of the cup holder and also reduce the weight of the cup holder.

Further, the restricting part 32, provided on the opening part 23, is located towards a storing part 13 side compared to the axial parts 31, 31. Therefore, the holder 14, which was pushed in by the user's finger, may be received before the axial parts 31, 31. As a result, it is possible to more effectively prevent the axial parts 31, 31 from breaking. In particular, the position of the restricting part 32 is set to be at a height corresponding to a position at which the finger hits when the user inserts the finger between the beverage container Y and the side wall 12 of the storing part 13. In this way, it is possible to reliably receive the force being applied by the finger.

Furthermore, the restricting part receiving member 43, which relatively receives the restricting part 32, is formed so that the restricting part receiving member 43 is dropped in between the upper side wall part 42 of the holder 14 and the lower side wall part 41. As a result, the restricting part receiving member 43 can receive the restricting part 32 at a deeper position closer to the guide part 35. Therefore, in a condition in which the holder 14 is restricted from being pushed in, the guide part 35 of the holder 14 becomes closer to the restricting part 32. Hence, the holder 14 may be supported in a stable manner at the maximum storage position.

Here, the upper portion of the holder 14 is supported, with the axial parts 31, 31 being the center. The axial parts 31, 31 are provided on the opening part 23 along a horizontal direction. The lower portion of the holder 14 is provided so that the holder 14 may protrude and retract with respect to the opening part 23 by oscillating. Therefore, when the user inserts a finger between the constriction part K of the beverage container Y and the side wall 12 of the storing part 13, a lopsided force will not be applied to an oscillation towards a storage position of the holder 14.

Further, since the restricting part 32 acts as a reinforcing member to enhance the strength of the opening part 23, there is no need to increase the thickness around the opening part 23, nor is it necessary to place a separate reinforcing component. Therefore, the overall size can be reduced.

Further, the restricting part 32 is also advantageous in that, even when the user thinks that the beverage container Y cannot be pulled up, and therefore inserts a finger between the beverage container Y and the storing part 13 and pushes in the holder 14, the restricting part 32 can make the user feel that the holder 14 has been pushed into a releasing position, thereby making the user to refrain from pushing in the holder 14 any further.

While a preferred embodiment of the present invention has been described above, it should be understood that these are exemplary of the invention and are not to be considered as limiting the present invention. Additions, omissions, substitutions, and other modifications can be made without departing from the scope of the present invention. For example, in the embodiment described above, an example was described in which a cup holder is provided on a console. However, the present invention may also be applied to a cup holder placed on a center cluster. The invention is not to be considered as being limited by the foregoing description, and is only limited by the scope of the appended claims.

What is claimed is:

1. A cup holder holding an object, the cup holder comprising:
    a bottom wall and a side wall that cooperate to define a storing part that receives the object, the storing part being cylindrical and opened at an upper portion, wherein the side wall includes an interior face that faces toward the object received by the storing part;

the side wall defining an opening part that includes opposing wall parts facing one another and connected by a rear wall, wherein the rear wall faces toward the object received by the storing part;

a holder that is biased towards an interior of the storing part and is received between the opposing wall parts of the opening part so that the holder may protrude and retract, the holder defining a maximum storage position when the holder is retracted so that a flat part of the holder is generally coplanar with the interior face of the side wall for receipt of the object; and axial parts that protrude from the respective opposing wall parts to rotatably receive the holder;

a restricting part that is spaced from the rear wall and extends between the opposing wall parts to connect the opposing wall parts to one another, the restricting part being spaced from the interior face a distance that is less than a distance between the axial parts and the interior face when the holder is at the maximum storage position, wherein a central portion of the flat part is at a same height as the restricting part when the holder is at the maximum storage position.

2. The cup holder according to claim 1, wherein an upper part of the holder is supported, centered around the axial parts provided on the opening part along a horizontal direction; and a lower part of the holder is provided to the opening part so that the lower part may protrude and retract by oscillating.

3. The cup holder according to claim 1, wherein the restricting part is provided so as to straddle across the opening part.

4. The cup holder according to claim 1, wherein a guide part is provided at a lower part of the holder, the guide part elastically supporting a peripheral wall of the object, the guide part also directing a reactive force, received by the object in a normal line direction at a contact point with the object, towards a position lower than the axial part.

* * * * *